(12) United States Patent
Kesarwani et al.

(10) Patent No.: US 12,169,509 B2
(45) Date of Patent: Dec. 17, 2024

(54) ARBITRARY DIMENSIONAL RESOURCE ACCOUNTING ON N-ARY TREE OF ASSETS IN DATABASES

(71) Applicant: Salesforce, Inc., San Francisco, CA (US)

(72) Inventors: Saurabh Kesarwani, Bangalore (IN); Sandeep Ratnaparkhe, Bangalore (IN); Shweta Parekh, Bengaluru (IN); Milind Phadke, Hyderabad (IN); Adheip Varadarajan, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 19 days.

(21) Appl. No.: 18/162,514

(22) Filed: Jan. 31, 2023

(65) Prior Publication Data
US 2024/0143629 A1 May 2, 2024

Related U.S. Application Data

(60) Provisional application No. 63/381,212, filed on Oct. 27, 2022.

(51) Int. Cl.
*G06F 16/28* (2019.01)
*G06F 16/2455* (2019.01)

(52) U.S. Cl.
CPC ...... *G06F 16/285* (2019.01); *G06F 16/24556* (2019.01)

(58) Field of Classification Search
CPC .................. G06F 16/285; G06F 16/24556
USPC .......................................................... 707/740
See application file for complete search history.

(56) References Cited

U.S. PATENT DOCUMENTS

| | | | |
|---|---|---|---|
| 9,406,036 B2 * | 8/2016 | Kaufman | G06Q 10/06 |
| 10,402,174 B2 | 9/2019 | Varadarajan et al. | |
| 10,509,633 B2 | 12/2019 | Varadarajan et al. | |
| 10,514,896 B2 | 12/2019 | Varadarajan et al. | |
| 10,540,149 B2 | 1/2020 | Varadarajan et al. | |
| 10,817,652 B2 | 10/2020 | Dmytrenko et al. | |
| 10,846,068 B2 | 11/2020 | Varadarajan et al. | |
| 11,030,210 B2 | 6/2021 | Hussain et al. | |
| 11,113,459 B1 | 9/2021 | Olsson et al. | |
| 11,537,283 B2 | 12/2022 | Gonzalez et al. | |
| 2010/0106724 A1 * | 4/2010 | Anderson | G06N 20/00 707/E17.046 |

(Continued)

*Primary Examiner* — Cam Linh T Nguyen
(74) *Attorney, Agent, or Firm* — Kwan & Olynick LLP

(57) ABSTRACT

In some embodiments, a method receives a label for a record in a database. A first operation is performed using a first value associated with the record to generate a first reporting object for a sustainability metric that is based on a resource. A second value for the first reporting object is generated based on performing the first operation using respective first values associated with first records based on a relationship in a data model to a first reporting object. The method uses the label to perform a second operation using the first value associated with the record to generate a third value for a second reporting object for the sustainability metric. The second reporting object is generated based on performing the second operation using respective first values associated with second records that are associated with the label.

20 Claims, 10 Drawing Sheets

(56) References Cited

U.S. PATENT DOCUMENTS

| | | | |
|---|---|---|---|
| 2010/0274377 A1* | 10/2010 | Kaufman | G06Q 10/06 |
| | | | 700/103 |
| 2014/0114489 A1* | 4/2014 | Duff | G06Q 50/06 |
| | | | 700/291 |
| 2018/0350006 A1* | 12/2018 | Agrawal | G06F 7/08 |
| 2020/0097137 A1 | 3/2020 | Jacobson et al. | |
| 2020/0097141 A1 | 3/2020 | Jacobson et al. | |
| 2020/0097267 A1 | 3/2020 | Olsson et al. | |
| 2020/0097268 A1 | 3/2020 | Olsson et al. | |
| 2021/0182275 A1* | 6/2021 | Su | G06F 16/252 |
| 2021/0224254 A1 | 7/2021 | Kesarwani | |
| 2021/0382909 A1 | 12/2021 | Addala et al. | |
| 2022/0414576 A1* | 12/2022 | Reineke | G06Q 10/0633 |
| 2023/0237398 A1* | 7/2023 | Reineke | G06Q 10/0633 |
| | | | 705/7.25 |

* cited by examiner

ARBITRARY DIMENSIONAL RESOURCE ACCOUNTING ON N-ARY TREE OF ASSETS IN DATABASES

CROSS REFERENCE TO RELATED APPLICATIONS

Pursuant to 35 U.S.C. § 119(e), this application is entitled to and claims the benefit of the filing date of U.S. Provisional App. No. 63/381,212 filed Oct. 27, 2022, entitled "Arbitrary Dimensional Carbon Accounting on N-ary tree of Assets in Organizations", the content of which is incorporated herein by reference in its entirety for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever

FIELD OF TECHNOLOGY

This patent document relates generally to databases and more specifically to arbitrary dimensional resource accounting in databases.

BACKGROUND

Sustainability reporting has become more important as environmental concerns become priorities at organizations. One part of sustainability reporting may be based on a resource, such as an organization may report how much carbon emissions an organization emits. Traditionally, one-dimensional parent-child driven roll-ups and aggregations are used to perform reporting, such as to report an annual emissions inventory at an annual reporting object for an organization. In the process, a resource may be consumed by an asset. For example, a consumption may be using an automobile by an employee of the organization, using power at an office building of the organization, employees may travel, stay, and attend a conference, etc. The assets may be the automobile, the office building, the conference, etc. The consumptions may be use of the automobile (e.g., gas), power, or use of facilities at the conference. Another way to associate consumption is with the company events like conferences, etc. This brings an extra new dimension to emission calculations and reporting. Each of these consumptions may be associated with carbon emissions. The carbon emissions may be rolled up to a reporting period per entity of the organization. If the organization includes a number of subsidiaries, the carbon emissions for the subsidiaries may roll up to an overall parent object for the organization. These calculations may be a strict one thing rolls up to another one thing for accounting purposes. A data model of the organization may guide how the roll-ups are aggregated through entities in the organization to the overall parent reporting object. The data model method may not provide the sustainability reporting that an organization requires, such as when reporting becomes more regulated and more diverse reports are needed.

BRIEF DESCRIPTION OF THE DRAWINGS

The included drawings are for illustrative purposes and serve only to provide examples of possible structures and operations for the disclosed inventive systems, apparatus, methods and computer program products for databases. These drawings in no way limit any changes in form and detail that may be made by one skilled in the art without departing from the spirit and scope of the disclosed implementations.

DETAILED DESCRIPTION

Overview

Figure 1:
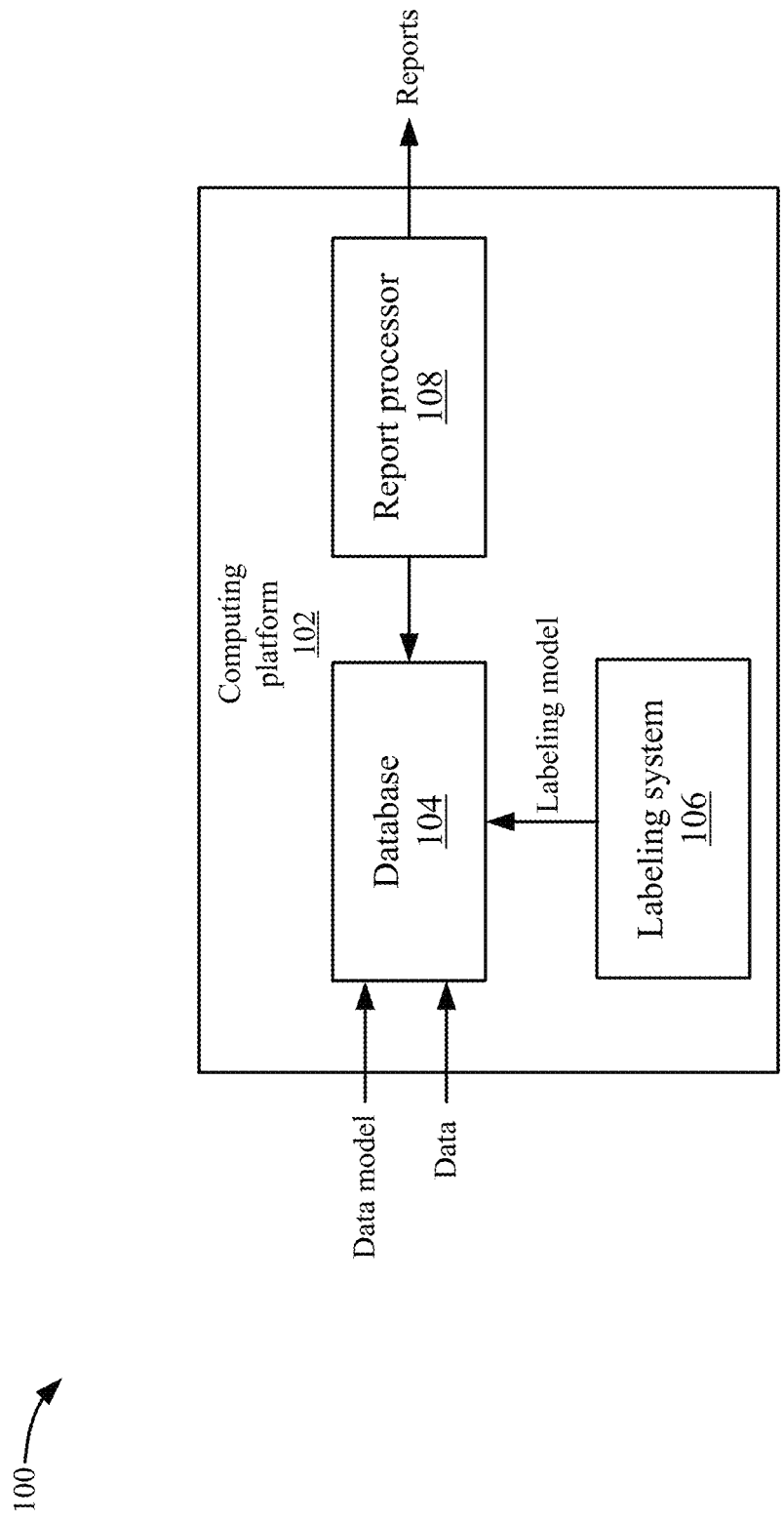
FIG. 1 depicts a computing platform for performing database operations for sustainability accounting according to some embodiments.

Types of resource accounting, such as carbon accounting, may refer to techniques to report values for a metric based on a resource. For example, the metric may estimate how much resource an organization uses, such as how much Carbon Dioxide ($CO_2$) is emitted. These estimations involve calculations to estimate $CO_2$ equivalents for consuming assets, and rollups for consolidating the emissions for different accounts in an organization. The accounts of the organization may be organized in a data model that describes an N-ary tree of relationships between accounts. A system may perform rollups and aggregations for emissions at each parent level and an overall parent level based on the data model. However, an organization may require reporting on arbitrary dimensions of reporting objects that may not be based on a relational data model of parent-child modeling. For example, an organization may want to report carbon emissions for the Asia-Pacific (APAC) region, for a country such as India, or for a conference. This type of reporting uses operations that are not supported by using the parent-child relationship of a data model of the organization structure.

To provide an improved database system, the system may use labels to tag records in the database to allow N-dimensional associations of records. For example, the system may add labels to records based on desired reporting objects of emissions. The system may label records for consumptions as required based on characteristics of the records. For example, if a label is India, the label India may be added to records that represent consumptions in India. The system may use the labels to perform roll-ups to parent reporting objects for the labels. The records that are aggregated by the rollups may be from different accounts of the organization and may not follow the parent-child relationships in the data model. The system may also ensure that the records that are rolled up to the reporting objects via labels can be rolled up to parent reporting objects via the data model without double counting of the records. For example, double counting may not occur because the reporting objects for labels may not be rolled up to the data model parent reporting objects. Rather, the system can generate a reporting object for carbon emissions related to consumptions in India using the labels, but the value for the India reporting object is not aggregated to an overall parent reporting object from the data model.

In some examples, a user may want to know the annual emissions inventory for the entire organization. The organization may include a number of subsidiaries. The data model may be used to roll up emissions inventories from the subsidiaries to an overall parent reporting object for the organization. Accordingly, the overall value may be determined from the data model of the organization. However, some regulations may specify the organization should provide emissions for other dimensions, such as for India, APAC, etc. The organization cannot use the data model to determine these values. However, using the labels, the organization can determine the emissions from the subsidiaries that occurred in India or the APAC regions.

System Overview

FIG. 1 depicts a computing platform 100 for performing database operations for sustainability accounting according to some embodiments. Sustainability accounting may be based on a metric associated with a resource. The resource may be used or emitted based on the use of an asset. For example, an organization might want to account for the carbon emissions that result from various consumptions associated with the organization. Other examples include the accounting of waste and water consumption of the organization, or other use of resources. Carbon emissions may be used for discussion purposes, but other uses of resources may be appreciated.

In some embodiments, carbon emissions accounting may include energy use tracking, carbon estimation, carbon footprint consolidation, and annual carbon emission inventory consolidation. Energy use tracking may track the consumption of various energy types within the organization. In energy use tracking, the energy consumption of various energy types within an organization may include stationary asset energy use, vehicle asset energy use, freight hauling energy use, rental car energy use, ground travel energy use, air travel energy use, hotel stay energy use, etc. The carbon emission estimation may convert energy consumption into equivalent carbon dioxide emissions based on different conversion methods. The carbon footprint consolidation may estimate carbon emissions for asset types that may be consolidated into carbon footprints, such as a stationary asset carbon footprint, a vehicle asset carbon footprint, etc. The carbon footprints of all assets in the accounts of the organization may be consolidated into an annual emissions inventory. The annual emissions inventory consolidation may consolidate the annual emissions inventory of accounts in the organization by rolling up all the carbon footprints for accounts within that organization. The annual emissions inventory may be used to offset the carbon footprint of an organization, such as the organization may buy carbon credits based on its annual emissions inventory. Also, the organization may wish to report its annual emissions inventory.

To perform the above accounting, computing platform 102 may provide different methods to generate reporting objects. For example, competing platform 102 may use a data model based roll-up of emissions. The organization may be organized in parent-child relationships that organize relationships among entities of the organization. The entities may be referred to as accounts of the organization. The accounts may be any portion of the organization, such as departments, subsidiaries, groups, etc. The emissions may be rolled up based on the relationships between parent and child nodes of the data model. A rollup may perform an operation to roll up a value from one account to another account in the data model. Although a rollup may be used, other methods may be used to aggregate values.

Database 104 may receive the data model. Then, database 104 receives records and stores the records in database 104. The records may be based on consumptions. Based on the consumptions, equivalent emissions may be associated with the records. For example, the use of a car may result in the consumption of X carbon tons. Then, database 104 may perform roll-ups to different reporting objects based on the parent-child relationships for the data model. The roll-ups will be described in more detail in FIG. 2.

Computing platform 102 may also allow labels to be associated with records. The labels may then be used to perform operations, such as roll-ups, to label reporting objects. For example, a labeling system 106 may be used to associate labels with records in database 104. In some examples, a labeling model may be used to determine which records to associate labels in database 104. Also, labels may be associated with records manually, such as input from users is received to associate a label with a record. Then, database 104 may use the labels to perform roll-ups to labeling reporting objects. The use of the labels will be described in more detail starting with FIG. 3.

A report processor 108 may query database 104 to generate reports. For example, a user may want to report on the annual emissions inventory for the entire organization. The organization may have six different subsidiaries and the annual emissions inventory for each subsidiary may be rolled up into a data model reporting object to represent the overall annual emissions inventory. This data model reporting object may use the parent child relationships in the data model to perform the rollups to an aggregation of the annual emissions inventory of the subsidiaries. Also, the organization may want to report the annual emissions inventory for other dimensions of the organization. For example, the organization may want to report the annual emissions inventory for Asia-Pacific (APAC), India, or a conference named conference name 1. For example, the organization may want to report emissions from subsidiaries in APAC or India. Also, a conference may be in San Francisco and the organization may want to report how much emissions are associated with that conference.

Data Model

Figure 2:
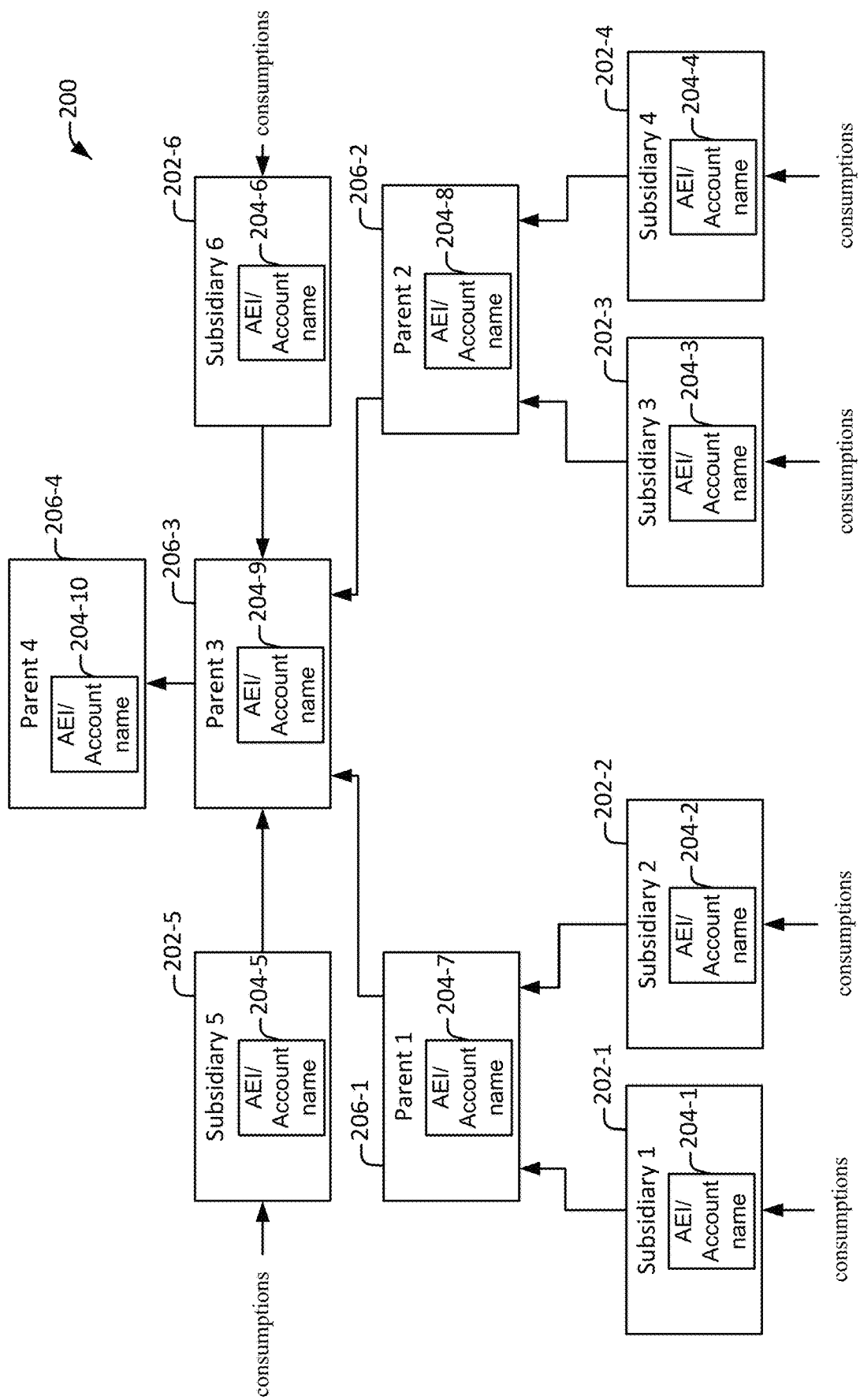
FIG. 2 depicts an example of a data model according to some embodiments.

FIG. 2 depicts an example of a data model 200 according to some embodiments. An organization may be associated with different accounts. An account may be a portion of the organization. For example, an organization may be associated with multiple subsidiaries, and each subsidiary may be associated with an account. Also, an organization may be associated with different offices, departments, etc., which may be considered accounts. The data model may define the structure of the organization for the reporting purposes.

In the example in FIG. 2, an organization may be associated with six subsidiaries 202-1 to 202-6, such as subsidiary 1, subsidiary 2, . . . , and subsidiary 6. Each subsidiary may be associated with records, such as records for the consumptions of an asset. For example, employees of subsidiary 1 may consume some resource using an asset, which may be converted into equivalent carbon emissions. In some examples, subsidiary 1 may be associated with a vehicle asset energy use, which results in carbon emissions. Subsidiary 2 may be associated with a commercial building's energy consumption, which results in carbon emissions. In general, each subsidiary may be associated with consumptions. The consumptions may be converted into a metric value, such as associated emissions. Those emissions may be rolled up into carbon footprints for each associated asset. Then, the carbon footprints are rolled up into an annual emissions inventory for a subsidiary. Each subsidiary may be associated with an annual emissions inventory 204. For example, subsidiaries 1 to 6 are associated with annual emissions inventories 204-1 to 204-6. The annual emissions inventory may be stored with an account name, such as a record for subsidiary 1 is stored for the annual emissions inventory of 100 tons and the account name of subsidiary 1. Annual emissions inventory may be used for discussion purposes, but other resource use may be appreciated.

Then, the data model may define parent reporting objects for the subsidiaries. For example, based on the data model, subsidiary 1 and subsidiary 2, roll up to a parent object 206-1. The annual emissions inventories for subsidiary 1 and subsidiary 2 may be aggregated as an annual emissions inventory 204-7 with the account name parent 1. Similarly, subsidiary 3 and subsidiary 4 are associated with a parent 2 reporting object. Parent 2 includes an annual emissions inventory 204-8 that aggregates the annual emissions inventory for subsidiary 3 and subsidiary 4. The annual emissions inventory 208-4 may be associated with an account name for parent 2.

A parent 3 reporting object may aggregate the annual emissions inventory for parent 1 and parent 2 in addition to the annual emissions inventory for subsidiary 5 and subsidiary 6. The annual emissions inventory 204-9 may be associated with an account name for parent 3. Then, the annual emissions inventory for parent 3 may be rolled up to a top level overall annual emissions inventory for the organization at parent 4 reporting object 206-4. An annual emissions inventory 204-10 may be associated with an account name of parent 4. The annual emissions inventory at 204-10 may be the annual emissions inventory for the organization that is rolled up via the parent child relationships in the data model. The data model may be a one-to-one relationship between accounts of the organization. As described above, the data model may not allow N-dimensional relationships in the organization for accounting purposes. The following will describe using labels to extend the reporting of emissions according to some embodiments.

Labeling Model

Figure 3:
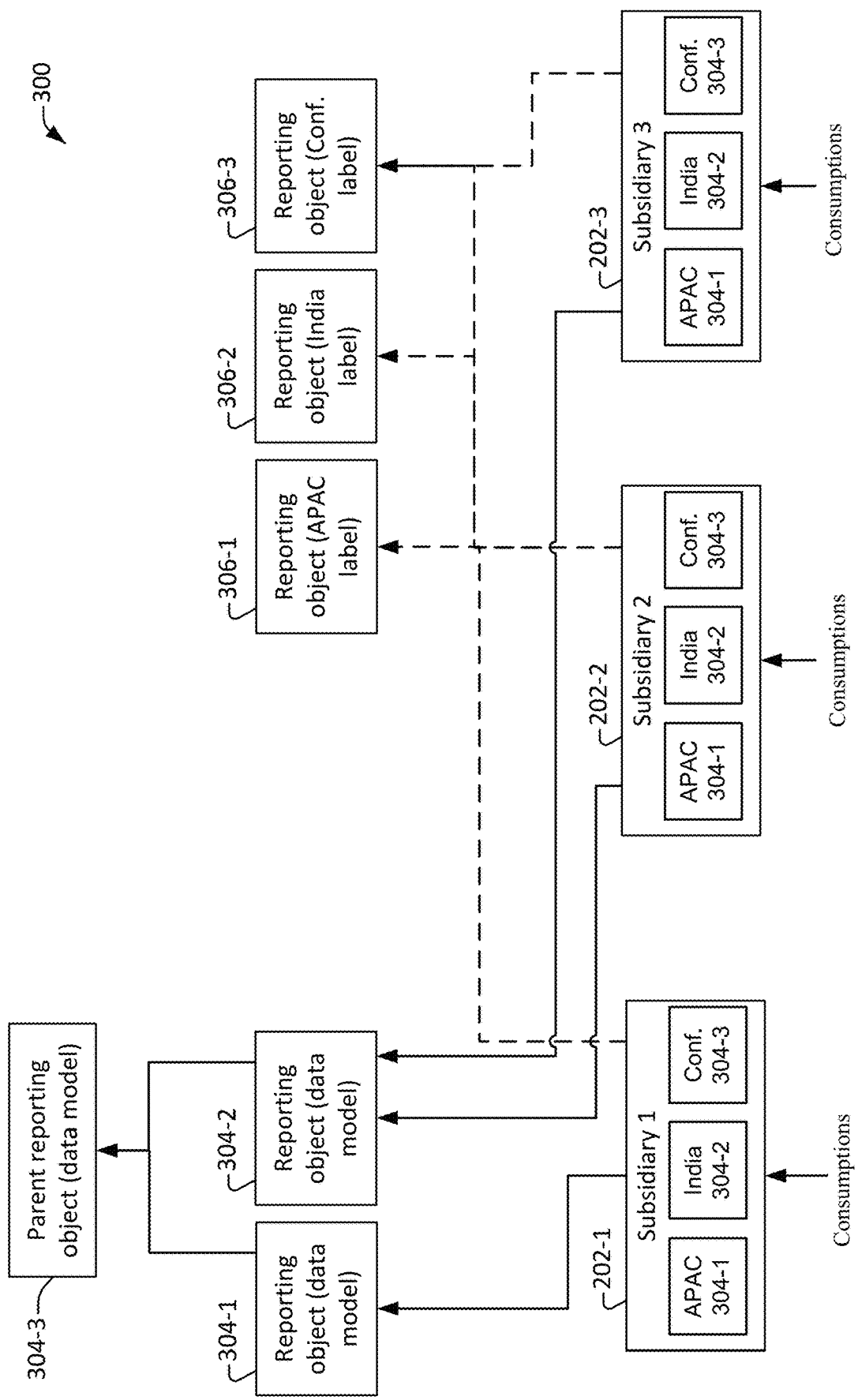
FIG. 3 depicts an example of a labeling model according to some embodiments.

FIG. 3 depicts an example of a labeling model 300 according to some embodiments. Subsidiary 1, subsidiary 2, and subsidiary 3 from FIG. 2 may be shown for discussion purposes, but other subsidiaries may be appreciated. Each subsidiary may receive respective consumptions of assets, which are associated with emissions in records. Subsidiary 1, subsidiary 2, and subsidiary 3 may have their annual emissions inventory rolled up to data model reporting objects 304-1 and 304-2 as described by the process in FIG. 2. Then, the annual emissions inventory for reporting objects 304-1 and 304-2 may be rolled up to a parent data model reporting object 304-3. These are similar roll-ups and aggregations that are performed as described in FIG. 2.

The subsidiaries may be associated with tags 304-1 to 304-3. The labels may be based on categories to categorize records. For example, records for consumptions may be associated with labels based on a characteristic of a label. In some examples, the labels may include Asia-Pacific, India, and conference name 1. The label APAC 304-1 may be associated with a location of Asia-Pacific, the label India 304-2 may be associated with geographic characteristics of India, and the label Conf. 304-3 may be associated with characteristics of a conference that is held. When a first consumption occurs with a subsidiary in the Asia-Pacific region, a label of APAC 304-1 is associated with that record of consumption. For example, the record of the consumption may have a location that meets the location of the label of Asia-Pacific. Similarly, when a consumption occurs in India, a label of India 304-2 is associated with that consumption record. For example, the record of the consumption may have a location that meets the location of the label of India. When a consumption for a conference name 1 occurs, the label conference brand conference name 1 (Conf.) 304-3 is associated with that record. For example, the record of the consumption may have a characteristic that it occurred at the conference. Using the characteristics allows database 104 to associate labels with records that are received automatically. Also, input from a user may be used to manually label records. Records may be associated with multiple labels as long as the record meets the requirements for the label.

Different label reporting objects 306-1, 306-2, 306-3 may be used to perform operations, such as roll up and aggregate, on records for emissions based on labels. For example, a label reporting object 306-1 is associated with the APAC label, a label reporting object 306-2 is associated with the India label, and a conference name 1 reporting object is associated with the conference 1 label. In this case, emissions from records labeled with APAC 304-1 from subsidiary 1, subsidiary 2, and subsidiary 3 may be aggregated to the APAC label reporting object 306-1. Also, the emissions from records tagged with India 304-2 may be aggregated in the India label reporting object 306-2. Similarly, emissions from records tagged with conference name 1 label 304-1 may be aggregated in conference name 1 reporting object 306-3. In some examples, subsidiary 1 may have 40 tons of carbon emissions labeled with APAC, subsidiary 2 may have 60 tons of carbon emissions labeled with APAC, and subsidiary 3 may have 100 tons of carbon emissions labeled with APAC. The rollup of the emissions for reporting object 306-1 may be 200 tons. The rollup may retrieve values for a metric associated with records labeled with APAC for each subsidiary, and aggregate the values in an annual emissions inventory. Then, computing platform 102 may rollup the annual emissions inventory for each subsidiary to reporting object 306-1. Alternatively, computing platform 102 may aggregate all values from records labeled with APAC into reporting object 306-1.

The values for label reporting objects 306-1, 306-2, 306-3 may not be rolled up to data model reporting objects 304-1, 304-2, or 304-3. One reason why the roll-ups for label reporting objects may not occur is because this may result in double counting of emissions from records. For example, a record labeled with APAC 304-1 may be rolled up to parent reporting object 304-3 and label reporting object 306-1. Rolling up the value from label reporting object 306-1 to parent reporting object 304-3 may double count the emissions from a record labeled with APAC 304-1.

Data Model Processing

Figure 4:
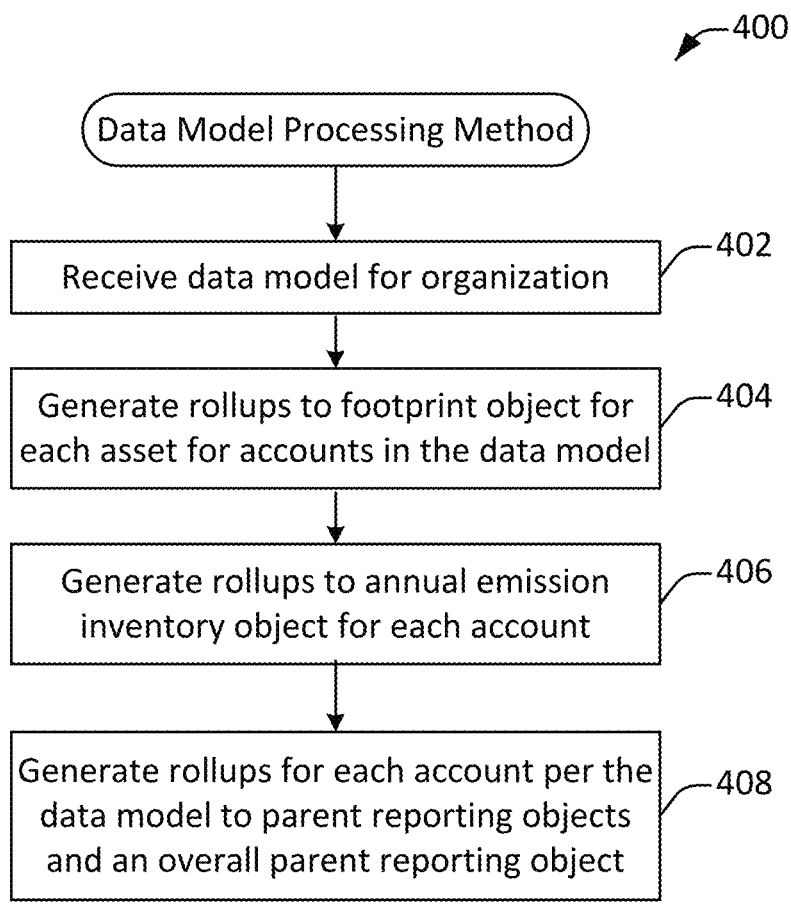
FIG. 4 depicts a simplified flow chart for processing a data model according to some embodiments.

FIG. 4 depicts a simplified flow chart 400 for processing a data model according to some embodiments. At 402, computing platform 102 receives a data model 200 for an organization. Data model 200 may define parent-child relationships for accounts in the organization. At 404, computing platform 102 generates an operation for each asset for accounts in the data model, such as roll-ups to a footprint object. For example, records generated by assets associated with an account may be rolled up to a footprint object. For example, a first footprint object may be a stationary asset carbon footprint and a second footprint object may be a vehicle asset carbon footprint. The stationary asset carbon footprint may receive consumptions from a stationary asset energy use 1 and a stationary asset energy use 2. The vehicle asset carbon footprint object may receive consumptions from a vehicle asset energy use 1 and a vehicle asset energy use 2. Consumption data in (Stationary Asset Energy Uses and Vehicle Asset Energy Use) gets rolled up to respective carbon footprints (Stationary Asset Carbon Footprint and Vehicle Asset Carbon Footprint). An example query may be SUM (Fuel Consumption), SUM (Emissions) from Stationary Asset Energy Uses GROUP BY ParentFootprintRecord.

At 406, computing platform 102 generates operations for objects for each account, such as roll-ups to an annual emissions inventory object for each account. For example, the annual emissions inventory for an account may aggregate the stationary asset carbon footprint value and the vehicle asset carbon footprint value. The aggregated numbers at respective footprints get further rolled up to Annual Emissions Inventory, which will represent total emissions across the organization. An example query may be SUM (Fuel Consumption), SUM (Emissions) from Carbon Footprints GROUP BY ParentAnnualEmissionsInventoryRecord.

At 408, computing platform 102 generates operations for each account per the data model to a parent reporting object, such as roll-ups for each account per the data model to the parent reporting object. For example, computing platform 102 may use an account-to-account relationship object in the data model to determine how to roll up the annual emissions inventory from one account to a parent reporting object. The account-to-account relationship may represent an edge of a child account to a parent account relationship in an N-ary tree. Computing platform 102 may use the relationship to generate roll-ups to aggregate the annual emissions inventory for each account at each parent level and then to an overall parent level based on the data model.

Label Processing

Figure 5:
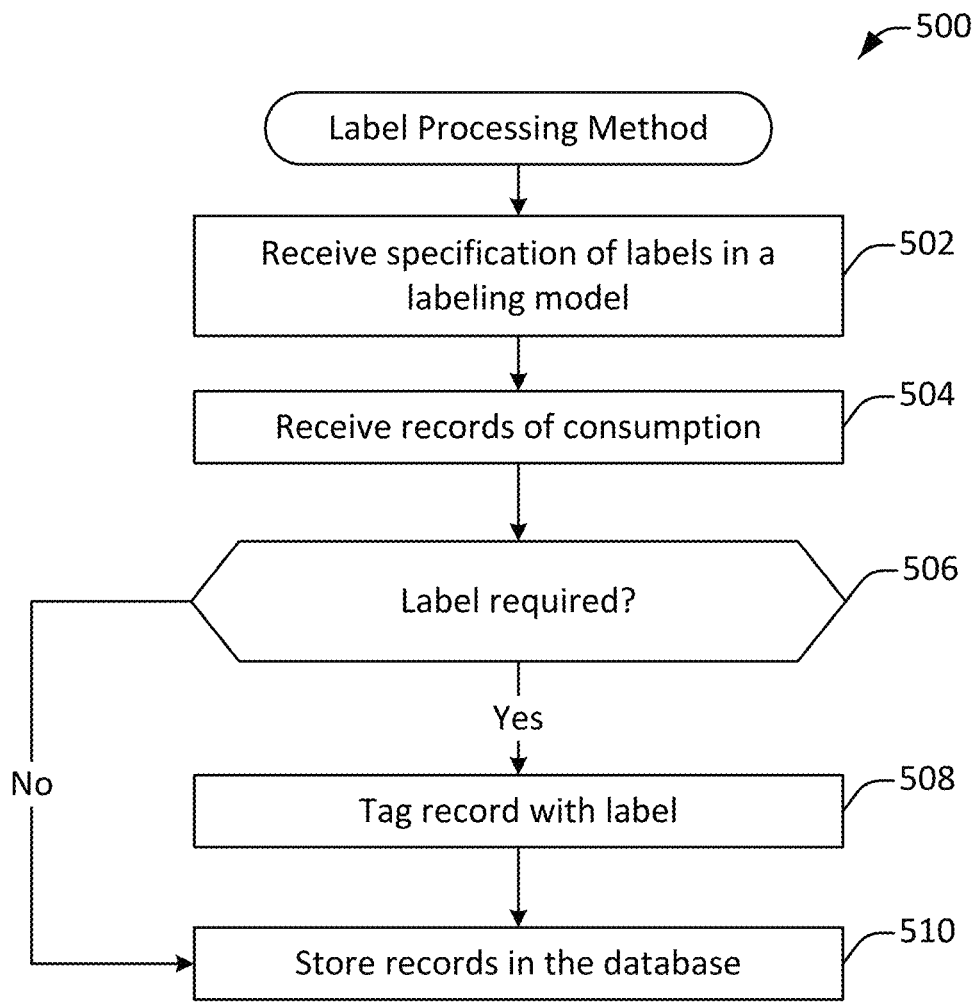
FIG. 5 depicts a simplified flowchart for tagging records with labels according to some embodiments.

The following will describe the processing of labels according to some embodiments. FIG. 5 depicts a simplified flowchart 500 for tagging records with labels according to some embodiments. At 502, computing platform 102 receives a specification of labels in a labeling model. The labeling model may specify characteristics in which a label can be associated with records. For example, the label may be APAC and the characteristics may be a geographic location of Asia-Pacific region or subsidiaries that are in the Asia-Pacific region.

At 504, computing platform 502 receives records of consumption. The records may be associated with a metric value, such as a carbon emission value. Then, at 506, computing platform 102 determines if a label is required. For example, computing platform 102 may analyze characteristics of the record to determine if any characteristics of labels match the characteristic. In some examples, a location for where the consumption occurred may be used to determine whether a geographic label should be tagged with the record. For example, computing platform 102 may use a location of the country of Korea for a record to determine the location meets the location requirement for the APAC tag.

If a label is required, at 508, computing platform 102 tags the record with the label. For example, computing platform 102 may store a label with the record. Then, at 510, computing platform 102 stores the records in the database.

Figure 6:
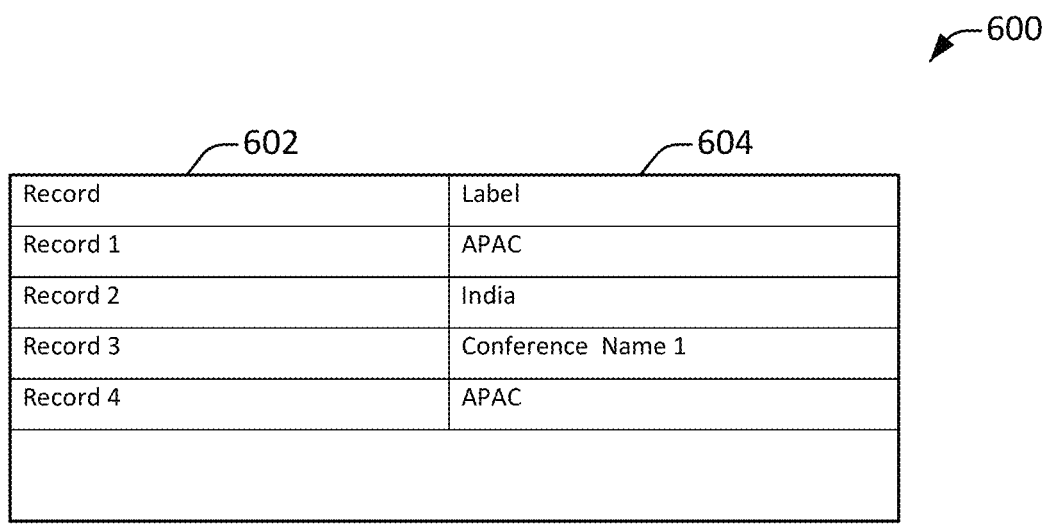
FIG. 6 depicts an example of a table that can be used to store label associations with records according to some embodiments.

FIG. 6 depicts an example of a table 600 that can be used to store label associations with records according to some embodiments. In table 600, a first column 602 may list a record and a second column 604 may list a label. The records in column 602 may be associated with multiple accounts or a single account. When a record is encountered and labeled, an identifier for the record may be stored in column 602 of table 600. Then, an identifier for the label associated with the record may be stored in column 604. For example, record 1 may be associated with the APAC label, record 2 is associated with the India label, record 3 is associated with the conference name 1 label, and record 4 is associated with the APAC label. The identifier may be a key to a record in a table. Labels may be stored in the database in an interest tags entity. The interest tag entity may be a table with various columns like RecordId, Name, Description etc. The relationship between a label (e.g., APAC) and which other records (e.g., Stationary Asset Emissions Source, Annual Emissions Inventory) that this label is applied/associated with may be stored in another entity called topic assignment, which has various columns like RecordId, InterestTagId, RelatedRecordId (like Stationary Asset Emissions SourceID or Annual Emissions Inventory ID), etc. that are used to determine the labels for records.

Rollup and Aggregation

Figure 7:
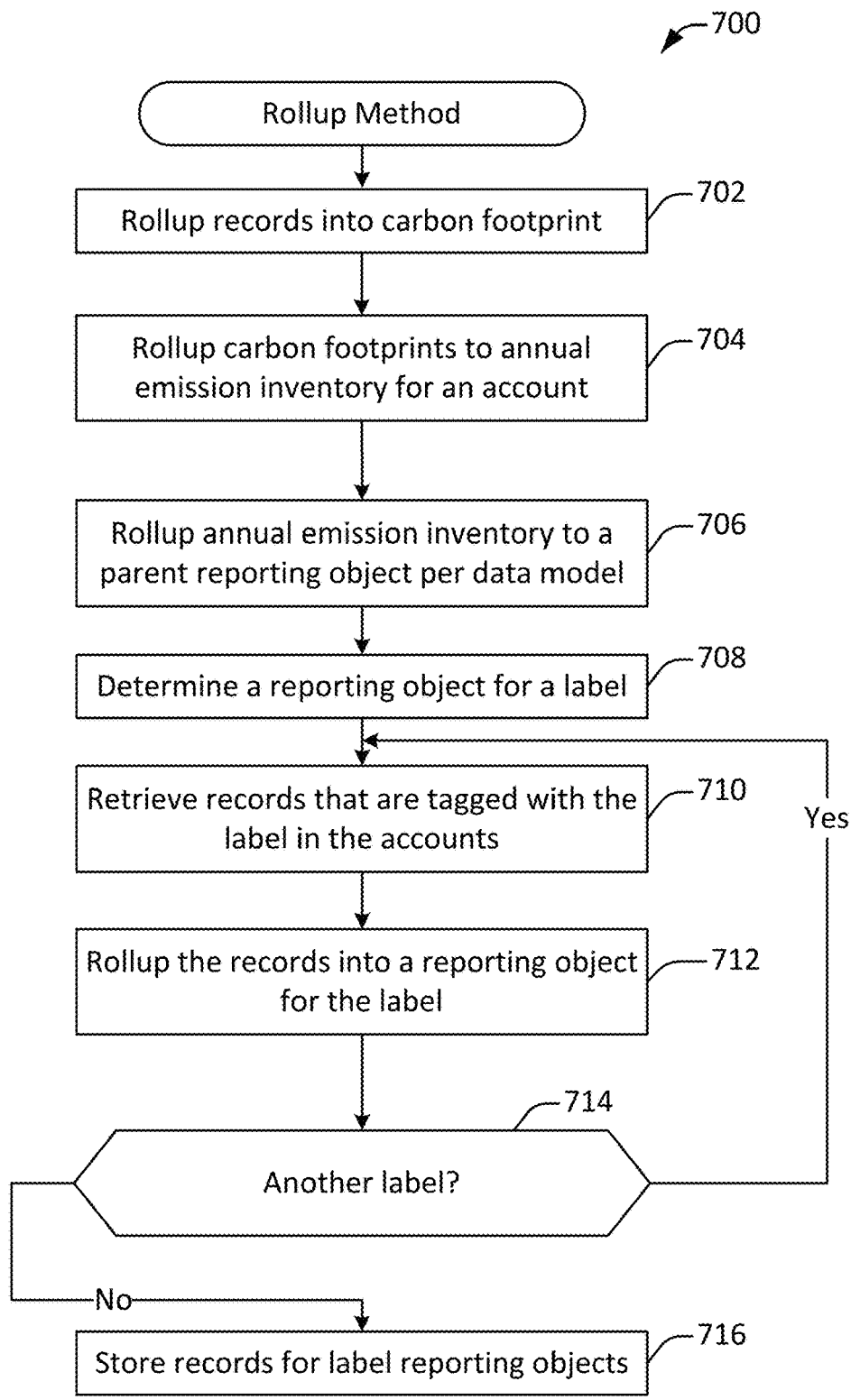
FIG. 7 depicts a simplified flowchart of a method for performing roll-ups according to some embodiments.

Computing platform 102 may perform operations, such as roll-ups, using the records based on the data model and the labels. Roll-up operations will be described, but other operations may be appreciated. FIG. 7 depicts a simplified flowchart 700 of a method for performing roll-ups according to some embodiments. Computing platform 102 may perform roll-ups based on a data model. At 702, computing platform 102 rolls up records into a carbon footprint for an account. For example, different uses for associated carbon footprints may be continually rolled up and recalculated based on the data model. In some examples, stationary asset energy use 1 and stationary asset energy use 2 are rolled up into a stationary asset carbon footprint.

At 704, computing platform 102 rolls up the carbon footprints to an annual emissions inventory for the account. For example, the stationary asset carbon footprint (e.g., 50 tons) and the vehicle asset carbon footprint (e.g., 100 tons) are rolled up into the annual emissions inventory (e.g., 150 tons). Computing platform 102 performs the above roll ups for multiple accounts. Then, at 706, computing platform 102 rolls up the annual emissions inventory for the accounts to a parent reporting object per the data model. For example, computing platform 102 may use account to account associations to determine how to roll up annual emissions inventory values to parent reporting objects.

Computing platform 102 may also perform roll-ups based on labels. At 708, computing platform 102 determines a reporting object for a label. For example, a reporting object may be created for the label APAC. At 710, computing platform 102 may retrieve records that are tagged with the label in the account. For example, computing platform 102 may perform a query with the label to determine records associated with the account. In some examples, computing platform 102 may determine records in table 600 for the label, such as APAC. Using the identifiers for the records, computing platform 102 may retrieve the records from database 104 and perform the roll-ups to the label reporting object, such as aggregating the values from the records in database 104. A query to retrieve records with labels may be SELECT Id, RelatedRecordIDfromTopicAssignment where InterestTagId in (SELECT Id from . . . ). The query may select records based on the label stored in the table topic assignment.

At 712, computing platform 102 rolls up the retrieved records into a reporting object for the label. For example, the carbon emissions for the APAC label may be rolled up into an APAC label reporting object.

At 714, computing platform 102 determines if another label needs to be processed. If so, the process reiterates to 710 where records for the new label are retrieved and rolled up into another label reporting object.

When all labels have been processed, at 716, computing platform 102 stores records for the label reporting objects. For example, a first record may have emissions of 1 ton, a second record has emissions of 3 tons, and a third record has emissions of 5 tons. Computing platform 102 retrieves the records using the label and aggregates the values for a total of 9 tons for the APAC reporting object. The reporting objects for the data model and the labels may be queried by a report processor 108.

Conclusion

Accordingly, the labels may improve the database operations that can be performed for records. Using labels, roll-ups may aggregate emissions at any arbitrary parent level in N dimensions. The operations may not be based on a relational data model of parent-child modeling, but rather based on labels. Many advantages may be appreciated, such as the labels may be infinitely scalable. Arbitrary dimensions may be used along which label reporting objects can be generated. Any new dimension may not require a schema dependency change. The labels may work along arbitrary complex hierarchies of label reporting objects. The number of reports can be arbitrarily large without impact on any of the use of labels. Also, there may be arbitrary overlaps in reporting in an arbitrary number of label reporting objects, but these are not problematic because the label reporting objects may not be rolled up to data model reporting objects.

Figure 8:
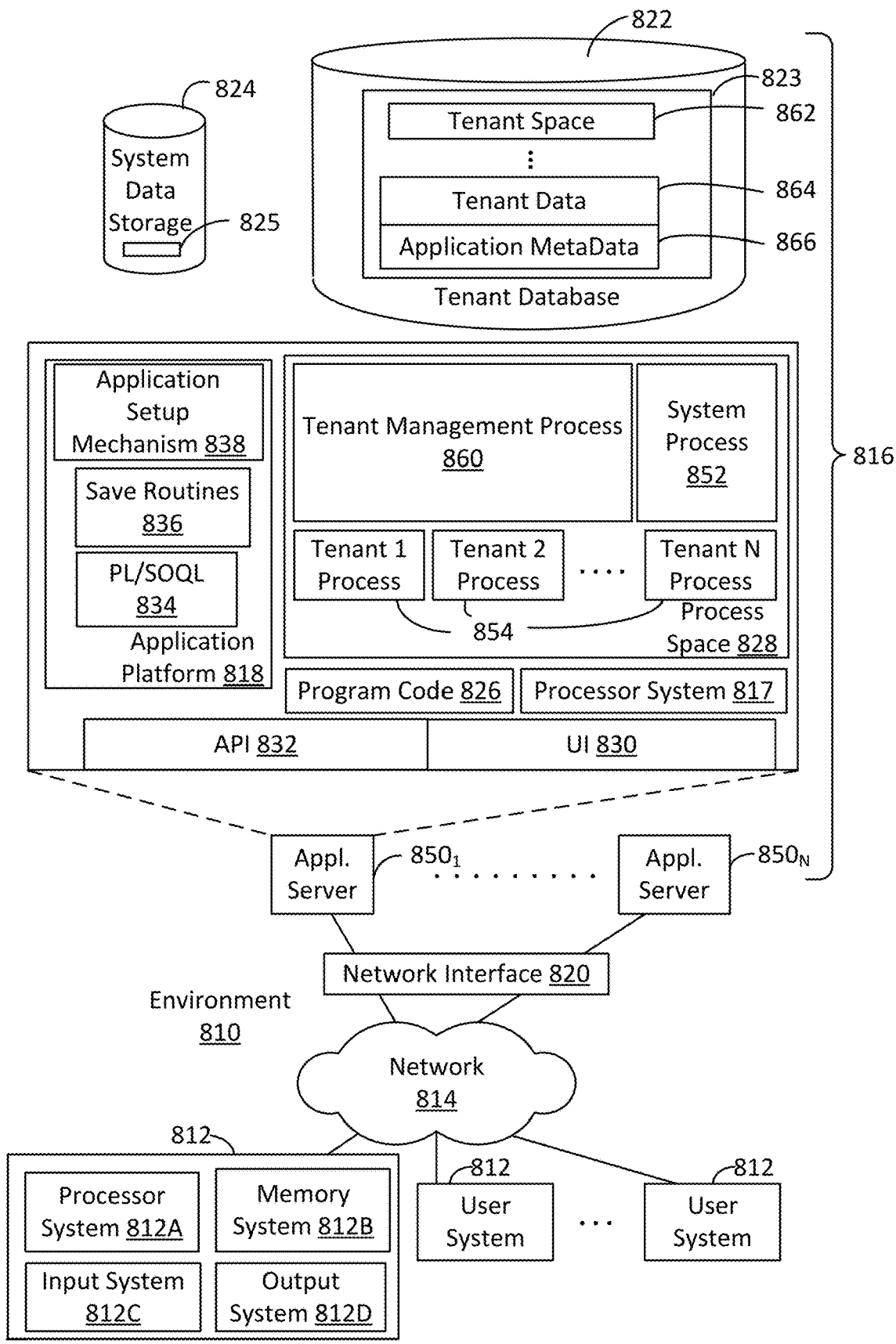
FIG. 8 shows a block diagram of an example of an environment that includes an on-demand database service configured in accordance with some implementations.

FIG. 8 shows a block diagram of an example of an environment 810 that includes an on-demand database service configured in accordance with some implementations. Environment 810 may include user systems 812, network 814, database system 816, processor system 817, application platform 818, network interface 820, tenant data storage 822, tenant data 823, system data storage 824, system data 825, program code 826, process space 828, User Interface (UI) 830, Application Program Interface (API) 832, PL/SOQL 834, save routines 836, application setup mechanism 838, application servers 850-1 through 850-N, system process space 852, tenant process spaces 854, tenant management process space 860, tenant storage space 862, user storage 864, and application metadata 866. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 816, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 818 may be a framework that allows the creation, management, and execution of applications in system 816. Such applications may be developed by the database service provider or by users or third-party application developers accessing the service. Application platform 818 includes an application setup mechanism 838 that supports application developers' creation and management of applications, which may be saved as metadata into tenant data storage 822 by save routines 836 for execution by subscribers as one or more tenant process spaces 854 managed by tenant management process 860 for example. Invocations to such applications may be coded using PL/SOQL 834 that provides a programming language style interface extension to API 832. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 866 for a subscriber making such an invocation. Such system processes may also manage execution of application metadata 866 as an application in a virtual machine.

In some implementations, each application server 850 may handle requests for any user associated with any organization. A load balancing function (e.g., an F5 Big-IP load balancer) may distribute requests to the application servers 850 based on an algorithm such as least-connections, round robin, observed response time, etc. Each application server 850 may be configured to communicate with tenant data storage 822 and the tenant data 823 therein, and system data storage 824 and the system data 825 therein to serve requests of user systems 812. The tenant data 823 may be divided into individual tenant storage spaces 862, which can be either a physical arrangement and/or a logical arrangement of data. Within each tenant storage space 862, user storage 864 and application metadata 866 may be similarly allocated for each user. For example, a copy of a user's most recently used (MRU) items might be stored to user storage 864. Similarly, a copy of MRU items for an entire tenant organization may be stored to tenant storage space 862. A UI 830 provides a user interface and an API 832 provides an application programming interface to system 816 resident processes to users and/or developers at user systems 812.

System 816 may implement a web-based computing platform 102. For example, in some implementations, system 816 may include application servers configured to implement and execute labeling software applications. The application servers may be configured to provide related data, code, forms, web pages and other information to and from user systems 812. Additionally, the application servers may be configured to store information to, and retrieve information from a database system. Such information may include related data, objects, and/or Webpage content. With a multi-tenant system, data for multiple tenants may be stored in the same physical database object in tenant data storage 822, however, tenant data may be arranged in the storage medium(s) of tenant data storage 822 so that data of one tenant is kept logically separate from that of other tenants. In such a scheme, one tenant may not access another tenant's data, unless such data is expressly shared.

Several elements in the system shown in FIG. 8 include conventional, well-known elements that are explained only briefly here. For example, user system 812 may include processor system 812A, memory system 812B, input system 812C, and output system 812D. A user system 812 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 812 to access, process and view information, pages and applications available from system 816 over network 814. Network 814 may be any network or combination of networks of devices that communicate with one another, such as any one or any combination of a LAN (local area network), WAN (wide area network), wireless network, or other appropriate configuration.

The users of user systems 812 may differ in their respective capacities, and the capacity of a particular user system 812 to access information may be determined at least in part by "permissions" of the particular user system 812. As discussed herein, permissions generally govern access to computing resources such as data objects, components, and other entities of a computing system, such as computing platform 102, a social networking system, and/or a CRM database system. "Permission sets" generally refer to groups of permissions that may be assigned to users of such a computing environment. For instance, the assignments of users and permission sets may be stored in one or more databases of System 816. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 816 may provide on-demand database service to user systems 812 using an MTS arrangement. By way of example, one tenant organization may be a company that employs a sales force where each salesperson uses system 816 to manage their sales process. Thus, a user in such an organization may maintain contact data, leads data, customer follow-up data, performance data, goals and progress data, etc., all applicable to that user's personal sales process (e.g., in tenant data storage 822). In this arrangement, a user may manage his or her sales efforts and cycles from a variety of devices, since relevant data and applications to interact with (e.g., access, view, modify, report, transmit, calculate, etc.) such data may be maintained and accessed by any user system 812 having network access.

When implemented in an MTS arrangement, system 816 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 816 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 816 may also maintain system-level data usable by multiple tenants or other data. Such system-level data may include industry reports, news, postings, and the like that are sharable between tenant organizations.

In some implementations, user systems 812 may be client systems communicating with application servers 850 to request and update system-level and tenant-level data from system 816. By way of example, user systems 812 may send one or more queries requesting data of a database maintained in tenant data storage 822 and/or system data storage 824. An application server 850 of system 816 may automatically generate one or more SQL statements (e.g., one or more SQL queries) that are designed to access the requested data. System data storage 824 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 9A:
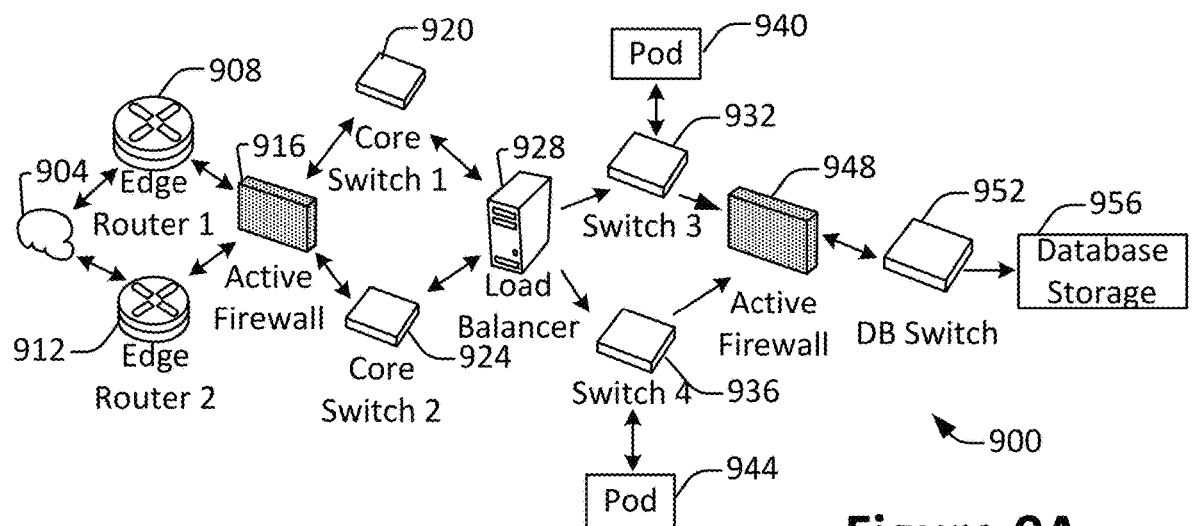
FIG. 9A shows a system diagram of an example of architectural components of an on-demand database service environment, configured in accordance with some implementations.

FIG. 9A shows a system diagram of an example of architectural components of an on-demand database service environment 900, configured in accordance with some implementations. A client machine located in the cloud 904 may communicate with the on-demand database service environment via one or more edge routers 908 and 912. A client machine may include any of the examples of user systems 812 described above. The edge routers 908 and 912 may communicate with one or more core switches 920 and 924 via firewall 916. The core switches may communicate with a load balancer 928, which may distribute server load over different pods, such as the pods 940 and 944 by communication via pod switches 932 and 936. The pods 940 and 944, which may each include one or more servers and/or other computing resources, may perform data processing and other operations used to provide on-demand services. Components of the environment may communicate with a database storage 956 via a database firewall 948 and a database switch 952.

Accessing an on-demand database service environment may involve communications transmitted among a variety of different components. The environment 900 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 9A and 9B.

The cloud 904 refers to any suitable data network or combination of data networks, which may include the Internet. Client machines located in the cloud 904 may communicate with the on-demand database service environment 900 to access services provided by the on-demand database service environment 900. By way of example, client machines may access the on-demand database service environment 900 to retrieve, store, edit, and/or process labeling information.

In some implementations, the edge routers 908 and 912 route packets between the cloud 904 and other components of the on-demand database service environment 900. The edge routers 908 and 912 may employ the Border Gateway Protocol (BGP). The edge routers 908 and 912 may maintain a table of IP networks or 'prefixes', which designate network reachability among autonomous systems on the internet.

In one or more implementations, the firewall 916 may protect the inner components of the environment 900 from internet traffic. The firewall 916 may block, permit, or deny access to the inner components of the on-demand database service environment 900 based upon a set of rules and/or other criteria. The firewall 916 may act as one or more of a packet filter, an application gateway, a stateful filter, a proxy server, or any other type of firewall.

In some implementations, the core switches 920 and 924 may be high-capacity switches that transfer packets within the environment 900. The core switches 920 and 924 may be configured as network bridges that quickly route data between different components within the on-demand database service environment. The use of two or more core switches 920 and 924 may provide redundancy and/or reduced latency.

In some implementations, communication between the pods 940 and 944 may be conducted via the pod switches 932 and 936. The pod switches 932 and 936 may facilitate communication between the pods 940 and 944 and client machines, for example via core switches 920 and 924. Also or alternatively, the pod switches 932 and 936 may facilitate communication between the pods 940 and 944 and the database storage 956. The load balancer 928 may distribute workload between the pods, which may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948, which may act as a computer application firewall operating at the database application layer of a protocol stack. The database firewall 948 may protect the database storage 956 from application attacks such as structure query language (SQL) injection, database rootkits, and unauthorized information disclosure. The database firewall 948 may include a host using one or more forms of reverse proxy services to proxy traffic before passing it to a gateway router and/or may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, the database storage 956 may be an on-demand database system shared by many different organizations. The on-demand database service may employ a single-tenant approach, a multi-tenant approach, a virtualized approach, or any other type of database approach. Communication with the database storage 956 may be conducted via the database switch 952. The database storage 956 may include various software components for handling database queries. Accordingly, the database switch 952 may direct database queries transmitted by other components of the environment (e.g., the pods 940 and 944) to the correct components within the database storage 956.

Figure 9B:
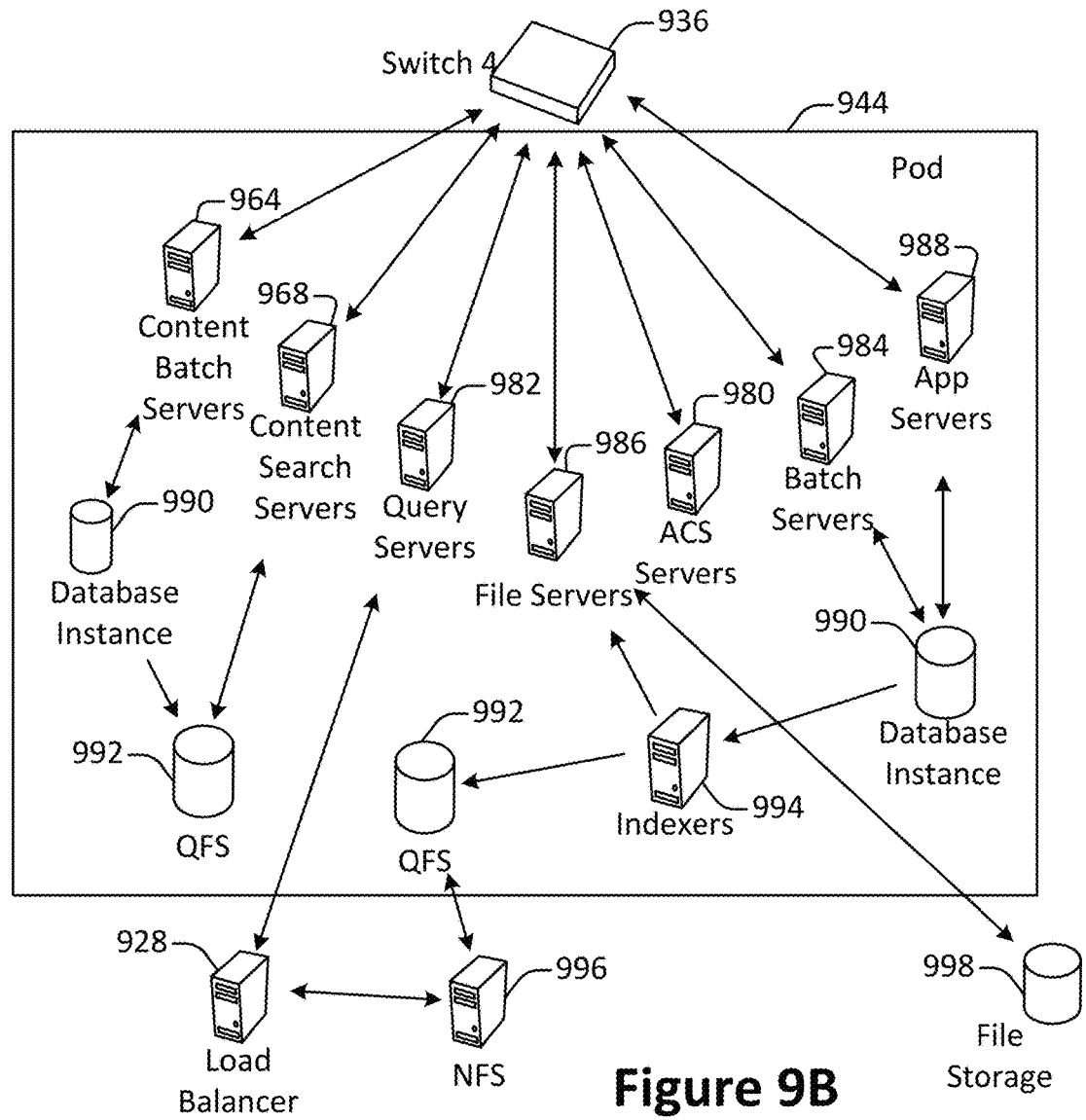
FIG. 9B shows a system diagram further illustrating an example of architectural components of an on-demand database service environment, in accordance with some implementations.

FIG. 9B shows a system diagram further illustrating an example of architectural components of an on-demand database service environment, in accordance with some implementations. The pod 944 may be used to render services to user(s) of the on-demand database service environment 900. The pod 944 may include one or more content batch servers 964, content search servers 968, query servers 982, file servers 986, access control system (ACS) servers 980, batch servers 984, and app servers 988. Also, the pod 944 may include database instances 990, quick file systems (QFS) 992, and indexers 994. Some or all communication between the servers in the pod 944 may be transmitted via the switch 936.

In some implementations, the app servers 988 may include a framework dedicated to the execution of procedures (e.g., programs, routines, scripts) for supporting the construction of applications provided by the on-demand database service environment 900 via the pod 944. One or more instances of the app server 988 may be configured to execute all or a portion of the operations of the services described herein.

In some implementations, as discussed above, the pod 944 may include one or more database instances 990. A database instance 990 may be configured as an MTS in which different organizations share access to the same database, using the techniques described above. Database information may be transmitted to the indexer 994, which may provide an index of information available in the database 990 to file servers 986. The QFS 992 or other suitable filesystem may serve as a rapid-access file system for storing and accessing information available within the pod 944. The QFS 992 may support volume management capabilities, allowing many disks to be grouped together into a file system. The QFS 992 may communicate with the database instances 990, content search servers 968 and/or indexers 994 to identify, retrieve, move, and/or update data stored in the network file systems (NFS) 996 and/or other storage systems.

In some implementations, one or more query servers 982 may communicate with the NFS 996 to retrieve and/or update information stored outside of the pod 944. The NFS 996 may allow servers located in the pod 944 to access information over a network in a manner similar to how local storage is accessed. Queries from the query servers 922 may be transmitted to the NFS 996 via the load balancer 928, which may distribute resource requests over various resources available in the on-demand database service environment 900. The NFS 996 may also communicate with the QFS 992 to update the information stored on the NFS 996 and/or to provide information to the QFS 992 for use by servers located within the pod 944.

In some implementations, the content batch servers 964 may handle requests internal to the pod 944. These requests may be long-running and/or not tied to a particular customer, such as requests related to log mining, cleanup work, and maintenance tasks. The content search servers 968 may provide query and indexer functions such as functions allowing users to search through content stored in the on-demand database service environment 900. The file servers 986 may manage requests for information stored in the file storage 998, which may store information such as documents, images, basic large objects (BLOBS), etc. The query servers 982 may be used to retrieve information from one or more file systems. For example, the query system 982 may receive requests for information from the app servers 988 and then transmit information queries to the NFS 996 located outside the pod 944. The ACS servers 980 may control access to data, hardware resources, or software resources called upon to render services provided by the pod 944. The batch servers 984 may process batch jobs, which are used to run tasks at specified times. Thus, the batch servers 984 may transmit instructions to other servers, such as the app servers 988, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 10:
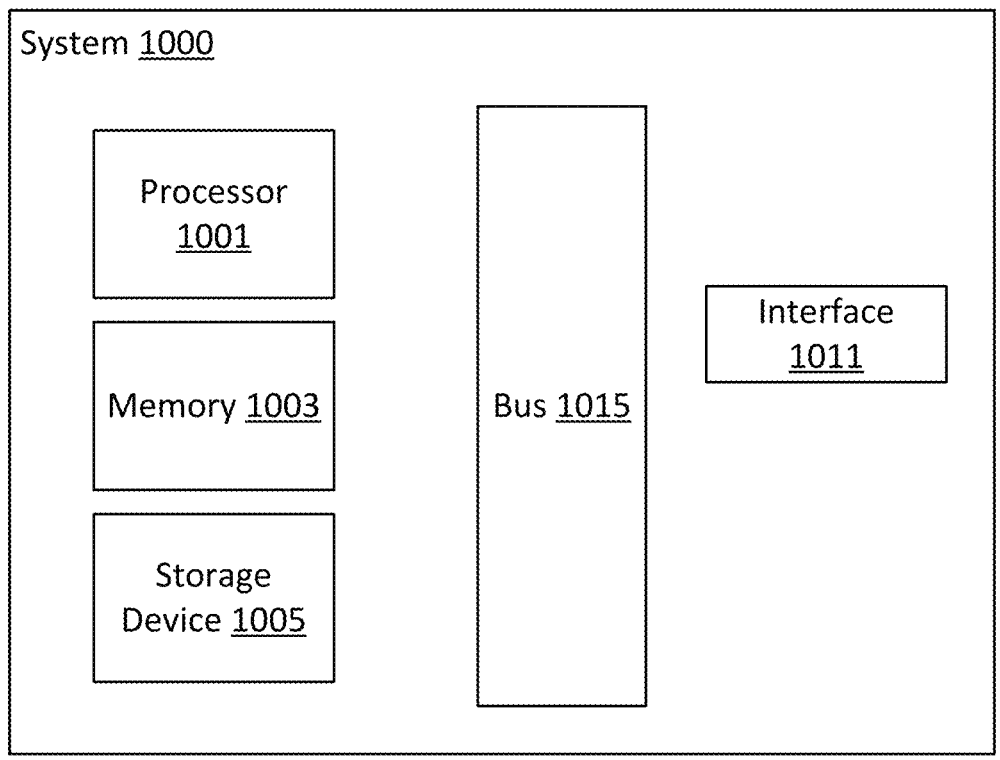
FIG. 10 illustrates one example of a computing device.

FIG. 10 illustrates one example of a computing device. According to various embodiments, a system 1000 suitable for implementing embodiments described herein includes a processor 1001, a memory module 1003, a storage device 1005, an interface 1011, and a bus 1015 (e.g., a PCI bus or other interconnection fabric.) System 1000 may operate as variety of devices such as an application server, a database server, or any other device or service described herein. Although a particular configuration is described, a variety of alternative configurations are possible. The processor 1001 may perform operations such as those described herein. Instructions for performing such operations may be embodied in the memory 1003, on one or more non-transitory computer readable media, or on some other storage device. Various specially configured devices can also be used in place of or in addition to the processor 1001. The interface 1011 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
    performing a first operation using respective first values associated with a set of first records to generate a second value for a first reporting object, wherein the set of first records are determined from a relationship in a data model to the first reporting object for a sustainability metric that is based on a resource, and wherein the set of first records include a record;
    retrieving a set of second records that are tagged with a label, wherein the set of second records includes the record and includes a different record than first records found in the set of first records; and
    performing a second operation, using respective first values associated with the set of second records that are associated with the label, to generate a third value for a second reporting object for the sustainability metric.

2. The method of claim 1, wherein the first operation is a rollup of first values for the set of first records based on the relationship in the data model to the first reporting object.

3. The method of claim 1, wherein the second operation is a rollup of first values for the set of second records that are associated with the label.

4. The method of claim 1, wherein the first operation is an aggregation of first values for the set of first records based on the relationship in the data model to the first reporting object.

5. The method of claim 1, wherein the second operation is an aggregation of first values for the set of second records that are associated with the label.

6. The method of claim 1, wherein the third value for the second reporting object is not used to generate the second value for the first reporting object.

7. The method of claim 1, further comprising:
    storing the label with an identifier for the record, wherein the identifier is used to retrieve the first value for the record to generate the third value for the second reporting object.

8. The method of claim 1, wherein:
    the record is associated with a consumption of an asset, and
    the consumption is converted into the first value for the sustainability metric.

9. The method of claim 1, wherein the second value for the first reporting object is generated by:
    determining a plurality of records for an account; and
    aggregating first values for that are associated with the plurality of records into a fourth value for the account.

10. The method of claim 9, wherein the second value for the first reporting object is generated by:
    determining respective fourth values for a plurality of accounts in the data model; and
    aggregating the fourth values for the plurality of accounts based on relationships between the accounts and the first reporting object in the data model.

11. The method of claim 1, wherein the second reporting object is generated by:
    determining respective first values for the set of second records; and
    aggregating the respective first values for the set of second records to generate the third value.

12. The method of claim 1, further comprising:
    determining whether a characteristic for the record meets a requirement for the label; and
    associating the label with the record when the characteristic meets the requirement.

13. The method of claim 1, wherein:
    a record in the set of first records is not found in the set of second records.

14. A non-transitory computer-readable storage medium having stored thereon computer executable instructions, which when executed by a computing device, cause the computing device to be configurable to cause:
    performing a first operation using respective first values associated with a set of first records to generate a second value for a first reporting object, wherein the set of first records are determined from a relationship in a data model to the first reporting object for a sustainability metric that is based on a resource, and wherein the set of first records include a record;
    retrieving a set of second records that are tagged with a label, wherein the set of second records includes the record and includes a different record than first records found in the set of first records; and
    performing a second operation, using respective first values associated with the set of second records that are associated with the label, to generate a third value for a second reporting object for the sustainability metric.

15. The non-transitory computer-readable storage medium of claim 14, wherein the first operation is a rollup of first values for the set of first records based on the relationship in the data model to the first reporting object.

16. The non-transitory computer-readable storage medium of claim 14, wherein the second operation is a rollup of first values for the set of second records that are associated with the label.

17. The non-transitory computer-readable storage medium of claim 14, wherein the first operation is an aggregation of first values for the set of first records based on the relationship in the data model to the first reporting object.

18. The non-transitory computer-readable storage medium of claim 14, wherein the second operation is an aggregation of first values for the set of second records that are associated with the label.

19. The non-transitory computer-readable storage medium of claim 14, wherein the third value for the second reporting object is not used to generate the second value for the first reporting object.

20. An apparatus comprising:
one or more computer processors; and
a computer-readable storage medium comprising instructions for controlling the one or more computer processors to be configurable to cause:
performing a first operation using respective first values associated with a set of first records to generate a second value for a first reporting object, wherein the set of first records are determined from a relationship in a data model to the first reporting object for a sustainability metric that is based on a resource, and wherein the set of first records include a record;
retrieving a set of second records that are tagged with a label, wherein the set of second records includes the record and includes a different record than first records found in the set of first records; and
performing a second operation, using respective first values associated with the set of second records that are associated with the label, to generate a third value for a second reporting object for the sustainability metric.

* * * * *